May 30, 1967 A. F. D'ALESSANDRO ET AL 3,322,770
HYDROGENATION OF QUINOLINE
Filed Feb. 12, 1964
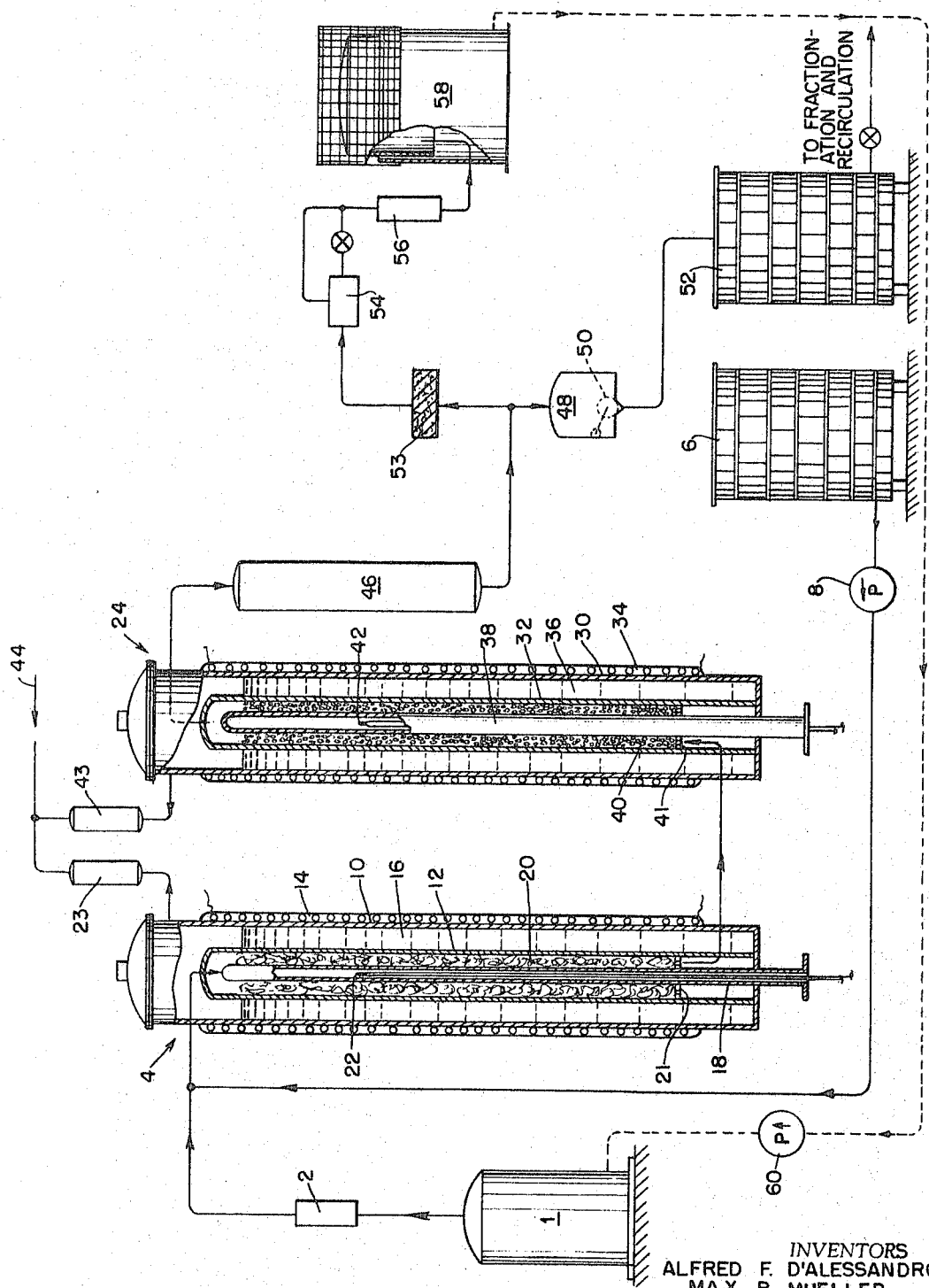
INVENTORS
ALFRED F. D'ALESSANDRO
MAX B. MUELLER
BY
AGENT ём
United States Patent Office 3,322,770
Patented May 30, 1967

3,322,770
HYDROGENATION OF QUINOLINE
Alfred F. D'Alessandro, Havertown, Pa., and Max B. Mueller, Morristown, N.J., assignors to Allied Chemical Corporation, New York, N.Y., a corporation of New York
Filed Feb. 12, 1964, Ser. No. 344,331
5 Claims. (Cl. 260—283)

This invention relates to a process for the hydrogenation of quinoline under conditions to obtain 5,6,7,8-tetrahydroquinoline (bz-THQ).

Various attempts have been made in the past to obtain quinoline derivatives saturated on the benzene ring by direct hydrogenation; however, even under high pressure only 1,2,3,4-tetrahydroquinoline (py-THQ) was obtained. If the hydrogenation, on the other hand, was carried too far, decahydroquinoline (DHQ) was obtained, wherein both rings are saturated. bz-THQ, which was obtained heretofore by complicated ring closure reactions, has a utility as a corrosion inhibitor for metal pickling, as an intermediate in the production of a variety of compounds, and is generally a more stable and active compound for side-chain reactions than py-THQ.

It is an object of the invention to provide a method for the direct hydrogenation of quinoline with good conversion into bz-THQ.

In accordance with the invention quinoline is hydrogenated in the presence of a noble metal catalyst at a temperature of at least 300° C. to form bz-THQ. The upper temperature and pressure limits are determined by the conditions under which bz-THQ decomposes.

While the hydrogenation process can be conducted with good conversion to the desired bz-isomer, this can be separated by fractionation from the product which also contains lesser amounts of unreacted quinoline, decahydroquinoline and py-THQ. The undesired products can then be recirculated and isomerized to obtain additional amounts of bz-tetrahydroquinoline under the original hydrogenation conditions.

After prolonged use, the noble metal catalyst can be regenerated when the ratio of bz-tetrahydroquinoline to py-THQ in the product starts to drop. The regeneration can be accomplished by a known oxidizing and subsequent rereducing cycle, the actual conditions of which may slightly vary from one noble metal and carrier to another, as well as from one commercial catalyst to another commercial one. The conditions of the regeneration cycle may be determined by routine experimentation for a particular set of circumstances.

The hydrogenation can be conducted, for instance, in accordance with the sole drawing of the disclosure, showing a partially detailed flow sheet of the process. Hydrogen stored in a tank 1 under pressure passes through a pressure-reducing and regulating valve and flowmeter 2 to a preheater tower 4. Quinoline, stored in a tank 6, is withdrawn and metered by a pump 8, and enters the preheater 4 together with the hydrogen. The reaction mixture is preheated in the preheater 4 and then passed into a reactor tower 24, substantially identical in all but one respect with the preheater tower.

The towers 4 and 24 each have an outer cylindrical jacket 10 and 30, each enclosing an inner cylindrical jacket 12 and 32, respectively. The outer cylindrical jackets 10 and 30 are surrounded by heater jackets 14 and 34, respectively, each containing a heating coil. The spaces 16, 36 between the outer and inner jackets are partially filled with a heat exchange medium, such as mercury. Thermowell tubes 18, 38 are concentrically disposed within the respective inner jackets 12, 32, and are enclosed at their upper end. The thermowell tubes 18, 38 each carry perforated flanges 21, 41 on the lower part of each tube, to support a contact surface mass 20, such as stainless steel packing or silica pebbles in the preheater tower 4, and a fixed bed of noble metal catalyst 40 in the reactor tower 24. Generally known noble metal hydrogenation catalyst, such as 0.3 percent platinum on ⅛" alumina pellets, 0.5% palladium on ⅛" alumina pellets, and 0.5% rhodium on 4–8 mesh granular carbon, were found to perform satisfactorily.

One or more thermocouples 22, 42 are positioned at various points in the thermowell tubes 18, 38 to allow the monitoring and regulating of the temperatures in the towers.

Reflux condensers 23 and 43 are provided for the heat exchange media 16, 36 respectively, and the heat exchange media in each tower are pressurized, as indicated by the arrow 44, with $CO_2$ to adjust the boiling point and selectively establish the desired temperature conditions for the hydrogenation.

The quinoline-hydrogen reaction mixture is preheated as it passes downwardly through the contact mass 20 in the preheater tower 4, where the quinoline is vaporized. Subsequently the preheated gas-vapor mixture enters the reactor 24 and, in moving through the fixed-bed catalyst 40, undergoes hydrogenation.

In practice, a plurality of thermocouples are disposed within the thermowell 38 throughout the entire length of the fixed catalyst bed. As the material to be hydrogenated enters the tower 24, the material first contacts the catalytic mass at its end adjacent to the entry point. Consequently, the greatest amount of catalytic action occurs at this point until the catalyst is exhausted at this point. The location of maximum catalytic action will then shift along the length of the catalytic bed away from the portion of the catalytic mass adjacent to the entry port, in the direction of the exit port. This progression of the location of maximum catalytic action continues until the loaction reaches the end of the catalytic bed adjacent to the exit port, in which case the catalytic mass is due for regeneration. Since the hydrogenation of quinoline is an exothermic reaction, the instantaneous location of maximum catalytic action along the length of the catalytic bed coincides with the location of maximum temperature along the length of the catalytic bed, and is also called the "hot spot." If a plurality of thermocouples are provided to monitor the temperature along the length of the catalytic bed, the progression of the hot spot from the entry port to the exit port can be used as an indicator to tell the operator when a regeneration of the catalyst becomes due.

The issuing hydrogenated product passes through a condenser 46 to a gas-liquid separator 48, which contains a trap float 50. As the liquid accumulates in the separator 48, the trap float 50 rises with the liquid level and allows the accumulated liquid product to drain into a product-collecting the tank 52.

The excess hydrogen separated from the hydrogenated liquid product passes through a fog filter 53, a pressure regulator 54 and a flowmeter-flow-recorder 56 into a collecting tank 58. The excess hydrogen may be withdrawn from the collecting tank 58, and recirculated to the hydrogen tank 1, as indicated by the dotted line and a pump 60, the latter assuring the withdrawal and the subsequent pressurizing of the circulated hydrogen for reuse in the process. The hydrogen absorption in the tower 24 can be continuously monitored by the difference indicated by the flowmeters 2 and 56, which are calibrated for the respective pressure conditions. The pressure regulator 54 is used to assure at all times a greater pressure on the left side thereof in the system than the pressure on the right side of the regulator, i.e., the gas recovery tank 58.

The equilibrium constants of the various runs conducted in accordance with the preceding disclosure were calculated and the hydrogenated product compositions are shown in Table I under various hot spot temperature and tower pressure conditions. The compositions are in mol percent.

From Table I it can be seen that the equilibrium conditions for the production of bz-THQ are favored at higher temperatures and pressures, and that a decrease in temperature can be compensated, to a certain extent, by a decrease in pressure. By the method of the invention quinoline conversion of up to 60 percent was obtained, of which 72 weight percent was bz-THQ. The quinoline feed was about 1.6 mols/hr. with an excess $H_2$ feed of about 10 mols/hr. Platinum, palladium, and rhodium noble metal catalysts were used and Pt and Pd were found to be substantially equally applicable and highly effective in the process of the invention. Rhodium catalysts resulted in a decomposition of a part of the quinoline into gaseous products, but still provided bz-THQ in a high ratio to py-THQ.

TABLE I

| Temperature (° C.) | Pressure (atm.) | bz-THQ | Quinoline | py-THQ | DHQ |
|---|---|---|---|---|---|
| 375 | 15 | 24.0 | 57.0 | 9.6 | 9.4 |
| 375 | 25 | 24.6 | 21.1 | 9.9 | 44.4 |
| 375 | 30 | 19.5 | 11.6 | 7.8 | 61.1 |
| 375 | 35 | 14.7 | 6.4 | 5.9 | 73.0 |
| 395 | 15 | 29.4 | 64.7 | 3.5 | 2.4 |
| 395 | 25 | 43.8 | 34.9 | 4.9 | 16.4 |
| 395 | 30 | 43.4 | 23.9 | 4.8 | 27.9 |
| 395 | 35 | 39.4 | 15.9 | 4.4 | 40.3 |
| 415 | 15 | 31.4 | 66.8 | 1.1 | 0.7 |
| 415 | 25 | 52.4 | 40.1 | 1.9 | 5.6 |
| 415 | 30 | 57.1 | 30.3 | 2.0 | 10.6 |
| 415 | 35 | 58.0 | 22.7 | 2.1 | 17.2 |

As already indicated, the bz-THQ can be obtained by fractionation of the hydrogenated product, and the remainder can be recirculated into the reaction conducted at equilibrium conditions favoring the formation of bz-THQ to thereby hydrogenate any unreacted quinoline and other hydroquinoline isomers to the desired product.

In the following some specific examples are given to further illustrate the process of the invention.

*Example 1*

1.6 mols/hr. quinoline and 12.3 mols/hr. hydrogen were fed through a preheater into a reactor constructed in accordance with the preceding disclosure. The system pressure was 310–320 p.s.i.g. with an exiting hydrogen rate of 10.0 mols/hr. The temperature of the catalyst hot spot was 400–410° C. 325 parts by volume catalyst were used, consisting of 0.3 percent platinum on 1/8" alumina pellets. The recovered product had the following composition in percent by weight: quinoline 46.7%, bz-THQ 47.0%, py-THQ 2.2% and unknown liquid 4.1%.

*Example 2*

The process of Example 1 was repeated with 0.5 percent palladium on 1/8" alumina pellets as a catalyst in this instance. The resulting product had the following composition: quinoline 48.4%, bz-THQ 42.5%, py-THQ 5.0%, and unknown liquid 4.1%.

*Example 3*

The product residue of a hydrogenation run, after the bz-THQ was separated therefrom, the residue containing 4.8 percent by weight quinoline and 95 percent by weight py-THQ, was hydrogenated at an input feed of 1.5 mols/hr. along with 10.0 mols/hr. hydrogen, at a pressure of 310 p.s.i.g. and a catalyst hot spot temperature of 394° C. in the presence of 325 parts by volume 0.3% platinum on 1/8" alumina pellets as a catalyst. The resulting product contained the following components expressed in percent by weight: quinoline 32.7%, bz-THQ 37.0%, py-THQ 12.7%, and unknown 17.6%.

It is to be understood that the process of the invention is disclosed by way of specific examples, therefore, the full scope of the invention is to be interpreted from the appended claims.

We claim:

1. A process for producing bz-tetrahydroquinoline, which comprises hydrogenating quinoline at a temperature of at least 300° C. in the presence of a noble metal catalyst.

2. The process of claim 1, wherein said catalyst is selected from the group consisting of platinum and palladium catalysts.

3. The process of claim 1, wherein said hydrogenation is conducted at a pressure of at least 10 atmospheres absolute, further comprising the steps of recovering bz-tetrahydroquinoline from the hydrogenated product, and further isomerizing the remainder of the product in the presence of hydrogen at a pressure of at least 10 atmospheres absolute and temperature of at least 300° C. in the presence of a noble metal catalyst to obtain additional amounts of bz-tetrahydroquinoline.

4. A process for producing bz-tetrahydroquinoline, which comprises reacting a mixture of quinoline and hydrogen under a pressure of at least 25 atmospheres absolute and a temperature of at least 400° C. in the presence of a noble metal catalyst selected from the group consisting of platinum and palladium catalysts, the upper pressure and temperature limits being determined by the conditions under which the bz-tetrahydroquinoline decomposes.

5. A process for preparing bz-tetrahydroquinoline from py-tetrahydroquinoline, which comprises contacting the py-tetrahydroquinoline in the presence of hydrogen and a noble metal catalyst at a temperature of at least 300° C.

References Cited

UNITED STATES PATENTS 2,918,470  12/1959  Krapcho et al. _____ 260—286

OTHER REFERENCES

Elderfield: Heterocyclic Compounds, vol. IV, Wiley, 1952, pp. 282–5.

ALEX MAZEL, *Primary Examiner.*

DONALD G. DAUS, *Assistant Examiner.*